(12) United States Patent
Park

(10) Patent No.: US 10,965,865 B2
(45) Date of Patent: Mar. 30, 2021

(54) APPARATUS FOR RECORDING DRIVE VIDEO OF A VEHICLE AND METHOD THEREOF

(71) Applicants: HYUNDAI MOTOR COMPANY, Seoul (KR); KIA MOTORS CORPORATION, Seoul (KR)

(72) Inventor: Se Young Park, Suwon-si (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 0 days.

(21) Appl. No.: 16/585,873

(22) Filed: Sep. 27, 2019

(65) Prior Publication Data

US 2021/0014409 A1    Jan. 14, 2021

(30) Foreign Application Priority Data

Jul. 9, 2019 (KR) .................. 10-2019-0082656

(51) Int. Cl.
  *G07C 5/08*   (2006.01)
  *H04N 5/232*  (2006.01)
  *H04N 5/77*   (2006.01)

(52) U.S. Cl.
  CPC ..... *H04N 5/23222* (2013.01); *H04N 5/23216* (2013.01); *H04N 5/77* (2013.01)

(58) Field of Classification Search
  CPC ... H04N 5/23222; H04N 5/23216; H04N 5/77
  See application file for complete search history.

(56) References Cited

U.S. PATENT DOCUMENTS

| | | | |
|---|---|---|---|
| 9,344,683 B1* | 5/2016 | Nemat-Nasser | G01S 19/23 |
| 2012/0108261 A1* | 5/2012 | Miyake | H04W 4/029 |
| | | | 455/456.1 |
| 2012/0115505 A1* | 5/2012 | Miyake | H04W 4/027 |
| | | | 455/456.1 |
| 2016/0216130 A1* | 7/2016 | Abramson | G01C 21/3423 |
| 2017/0279957 A1* | 9/2017 | Abramson et al. | |
| | | | H04M 1/6075 |
| 2018/0359445 A1* | 12/2018 | Liao | A61B 5/0022 |
| 2019/0188930 A1* | 6/2019 | Tsukahara | G07C 5/0866 |

* cited by examiner

*Primary Examiner* — Howard D Brown, Jr.
(74) *Attorney, Agent, or Firm* — Brinks Gilson & Lione

(57) ABSTRACT

An apparatus for recording a drive video of a vehicle is provided. The apparatus includes a position measuring device configured to acquire a position of the vehicle, a camera configured to capture an image of an area around the vehicle, and a controller configured to determine a capturing requirement of the camera based on the position of the vehicle, and to determine whether to apply the capturing requirement to the camera based on a user input.

20 Claims, 7 Drawing Sheets

APPARATUS FOR RECORDING DRIVE VIDEO OF A VEHICLE AND METHOD THEREOF

CROSS-REFERENCE TO RELATED APPLICATION

The present application claims priority to and the benefit of Korean Patent Application No. 10-2019-0082656, filed on Jul. 9, 2019, which is incorporated herein in its entirety by reference.

TECHNICAL FIELD

The present disclosure relates to an apparatus for recording a drive video of a vehicle and a method thereof.

BACKGROUND

The statements in this section merely provide background information related to the present disclosure and may not constitute prior art.

An apparatus for recording a drive video is a device for recording an image around a vehicle while driving the vehicle, and is mounted on the front or rear of the vehicle to record moving images, images, and sounds. The apparatus for recording the drive video is set such that shooting conditions of a camera may be changed only when a transmission gear of the vehicle is positioned at the Parking-stage. Therefore, when the vehicle is in a driving state, the apparatus for recording the drive video should shoot under preset shooting conditions. Thus, even when the vehicle is driving in an area where it is forbidden to shoot the drive video, because the shooting conditions of the camera cannot be changed, shooting is performed under the preset shooting conditions.

SUMMARY

One aspect of the present disclosure provides an apparatus for recording a drive video, by setting a shooting condition corresponding to an area in which the vehicle is positioned on the camera, based on the position of the vehicle, and shooting an area around the vehicle in the shooting condition corresponding to the area in which the vehicle is positioned, and a method for recording thereof.

The technical problems to be solved by the present disclosure are not limited to the aforementioned problems, and any other technical problems not mentioned herein will be clearly understood from the following description by those skilled in the art to which the present disclosure pertains.

In one form of the present disclosure, an apparatus for recording a drive video of a vehicle, may include a position measuring device acquiring a position of the vehicle, a camera shooting an area around the vehicle, and a controller determining a shooting condition of the camera, based on the position of the vehicle, and determining whether to set the shooting condition to the camera, based on whether a user input is present.

The controller may determine the shooting condition of the camera, based on whether the vehicle is positioned in a specific area.

The controller may determine that the shooting condition of the camera is a shooting condition corresponding to the specific area, when the vehicle is positioned in the specific area.

The shooting condition corresponding to the specific area may include a shooting condition allowed in a country.

The controller may allow the determined shooting condition of the camera to be set to the camera, when there is no user input.

The controller may allow the shooting condition of the camera, which is set to the camera, to be output, when the determined shooting condition of the camera is set to the camera.

The controller may allow a lamp provided in the vehicle to be blinked, when the determined shooting condition of the camera is set to the camera.

The controller may allow the determined shooting condition of the camera not to be set to the camera, when there is the user input.

The controller may determine the shooting condition of the camera as a shooting condition corresponding to a shooting restriction area, when the vehicle is positioned in a preset area including the shooting restriction area.

The controller may allow the shooting condition of the camera to be set as a previous shooting condition, when the vehicle is not positioned in the preset area including the shooting restriction area.

In another form of the present disclosure, a method for recording a drive video of a vehicle, may include acquiring a position of the vehicle, determining a shooting condition of a camera, based on the position of the vehicle, and determining whether to set the shooting condition to the camera, based on whether a user input is present.

The determining the shooting condition of the camera may be based on whether the vehicle is positioned in a specific area.

The shooting condition of the camera may be determined as a shooting condition corresponding to the specific area, when the vehicle is positioned in the specific area.

The shooting condition corresponding to the specific area may include a shooting condition allowed in a country.

The determined shooting condition of the camera may be set to the camera, when there is no user input.

The method may further include allowing the shooting condition of the camera, which is set to the camera, to be output, when the determined shooting condition of the camera is set to the camera.

The method may further include allowing a lamp provided in the vehicle to be blinked, when the determined shooting condition of the camera is set to the camera.

The determined shooting condition of the camera may be controlled not to be set to the camera, when there is the user input.

The shooting condition of the camera may be determined as a shooting condition corresponding to a shooting restriction area, when the vehicle is positioned in a preset area including the shooting restriction area.

The shooting condition of the camera may be set to a previous shooting condition, when the vehicle is not positioned in the preset area including the shooting restriction area.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
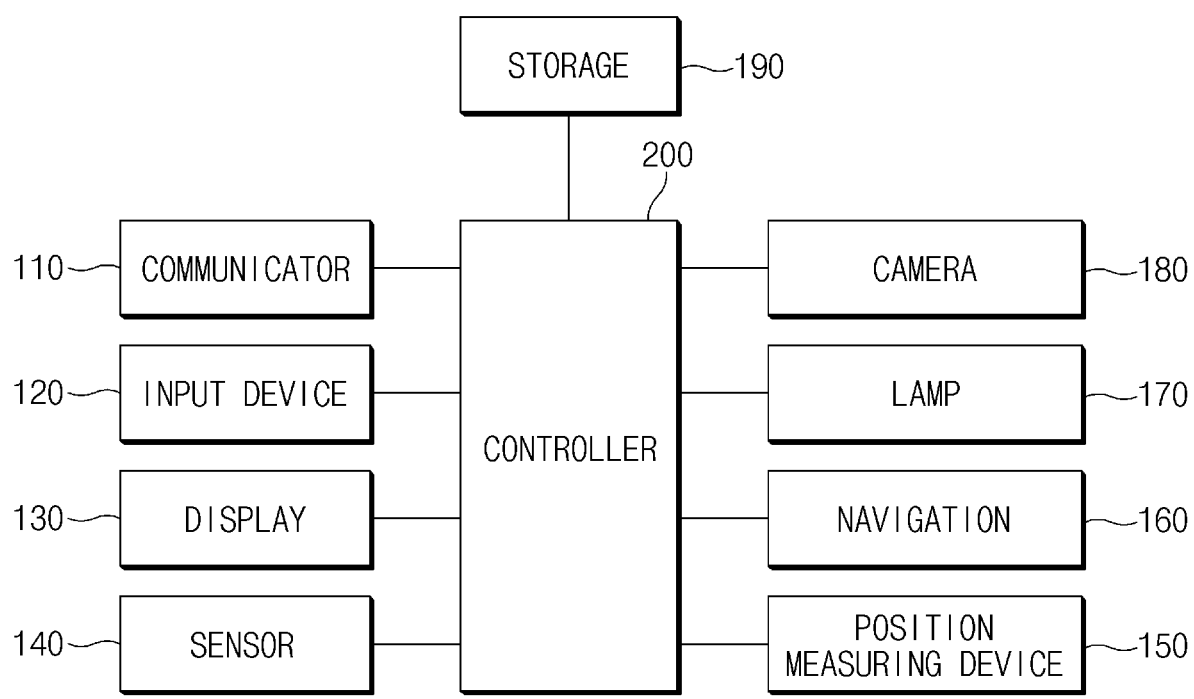
FIG. 1 is a block diagram illustrating an apparatus for recording a drive video of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the components of some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an apparatus for recording a drive video of a vehicle in some forms of the present disclosure.

Referring to FIG. 1, an apparatus 100 that records a drive video of a vehicle, in some forms of the present disclosure, may include a communicator 110, an input device 120, a display 130, a sensor 140, a position measuring device 150, a navigation 160, a lamp 170, a camera 180, a storage 190, and a controller 200.

The communicator 110 may be connected to a portable device and a server in a wired or wireless manner. The communicator 110 may receive information on a specific area and information on a shooting restriction area from the portable device or the server, and may update information previously stored in the vehicle. Here, the information on the specific area and the information on the shooting restriction area may include information such as traffic laws or privacy laws that are enforced in a certain country, and may include a shooting condition that is allowed based on laws or a shooting condition that is allowed in the shooting restriction area.

The communicator 110 may be connected by a USB cable when connected by wire, or may be connected by a Wi-Fi direct communication when connected wirelessly. In some forms of the present disclosure, the communicator 110 may be connected through a short-range wireless communication such as wireless broadband, World Interoperability for Microwave Access (Wimax), Bluetooth, Radio Frequency Identification (RFID), Infrared Data Association (IrDA), Ultra Wideband (UWB), and Zigbee.

The input device 120 may output an input signal that is an electrical signal corresponding to a user input. In some forms of the present disclosure, the user input may include at least one of a user's manual, a user's operation, and a user's voice. The input device 120 may be implemented by using at least one of a scroll wheel, a button, a knob, a touch screen, a touch pad, a lever, a track ball, a motion sensor, and a voice recognition sensor or a combination thereof.

The display 130 may be integrated with the input device 120, and may output a driving route which is acquired from the navigation 160. In addition, the display 130 may output information on the shooting condition corresponding to a region or an area in which the driving route is generated, on the driving route. The display 130 may be implemented by a display device employing such as a liquid crystal display (LCD) panel, a light emitting diode (LED) panel, an organic light emitting diode (OLED) panel, a plasma display panel (PDP), or the like. The liquid crystal display may include a thin film transistor liquid crystal display (TFT-LCD). According to an form, the input device 120 and the display 130 may be integrally implemented by a touch screen panel (TSP).

The sensor 140 may detect a shock that is applied to the vehicle. In some forms of the present disclosure, the sensor 140 may include an acceleration sensor, and the acceleration sensor may include a Gravity Sensor or a Gyro Sensor. The acceleration sensor may detect acceleration, angular velocity, angle, and the like of the vehicle, and may acquire an amount of up and down shock, an amount of front and back shock, and an amount of left and right shock.

The position measuring device 150 may receive a signal transmitted from a plurality of global positioning system (GPS) satellites to acquire a position of the vehicle. The position measuring device 150 may be included in the navigation 160 and may be integrated with the navigation 160.

The navigation 160 may provide the user with information on a specific area, for example, information of at least one country among a plurality of countries, in the form of a map, text, various symbols, or the like. The navigation 160 may provide and guide the user with a driving route to the destination. In addition, the navigation 160 may provide map image information, road guide image information, road guide voice information, vehicle speed information, destination information, and the like, based on the current position of the vehicle acquired from the position measuring device 150.

The navigation 160 may include a separate output device to provide various information related to the operation of the navigation 160 to the user. The output device may be implemented by a display device and a sound output device.

The display device may be implemented integrally with the display 130, by using the touch screen panel. The display device may visually display a map or various information related to the map. For example, the display device may display a map, a route that is displayed superimposed on the map, and various information related to the route. In more detail, the display device may display information about a route from a starting point to at least one destination, an estimated waiting time, or the total time required.

The sound output device may acoustically output a map or various information related to the map. For example, the sound output device may provide the user with the driving route or an event that occurs on the driving route, in the form of voice. The sound output device may be implemented using a speaker and related components.

The lamp 170 may include an indicator lamp that is provided at one side of the input device 120 or the camera 180. When a shooting condition corresponding to the specific area or a shooting condition corresponding to a shooting restriction area is set to the camera 180, the lamp 170 may be controlled to blink.

The camera 180 may be provided in a room mirror or at a dashboard of the vehicle, or may be provided at the rear part of the vehicle. The camera 180 may shoot the area around the vehicle, and the area around the vehicle may include a front area and a rear area of the vehicle. The camera 180 may shoot the area around vehicle under a set shooting condition. In some forms of the present disclosure, the camera 180 may be set as a default shooting condition when the vehicle is shipped. In some forms of the present disclosure, the default shooting condition may refer to a condition of shooting the area around the vehicle by turning on the camera 180 in real time. In addition, when the camera 180 is set to the shooting condition, which is determined based on the position of the vehicle, by the controller 200, the camera 180 may be switched to the shooting condition that is determined based on the position of the vehicle from the default shooting condition, and may shoot the area around the vehicle.

The storage 190 may store the shooting condition that is preset to correspond to the specific area when the vehicle is shipped, information on the shooting restriction area, and the shooting condition that is preset to correspond to the shooting restriction area. In addition, the storage 190 may store the shooting condition corresponding to the specific area, information on the shooting restriction area, and the shooting condition corresponding to the shooting restriction area, which are received from the portable device or the server. In addition, the storage 190 may store the shooting condition that is set to the camera 180.

The controller 200 may be implemented by various processing devices such as an application specific integrated circuits (ASICs), a digital signal processors (DSPs), a programmable logic devices (PLDs), a field programmable gate arrays (FPGAs), and a central processing units (CPUs), a microprocessor, or the like, which contain semiconductor chips that can perform operation or execution of various instructions. The controller 200 may control the overall operation of the apparatus for recording the drive video of the vehicle, in some forms of the present disclosure.

The controller 200 may determine the shooting condition of the camera 180, based on the position of the vehicle, and determine whether or not to set the shooting condition of the camera 180 to the camera 180 according to whether or not the user input is present.

In some forms of the present disclosure, the controller 200 may determine the shooting condition of the camera 180, based on whether the vehicle is positioned in a specific area. When it is determined that the vehicle is positioned in the specific area, the controller 200 may determine that the shooting condition of the camera 180 is a shooting condition corresponding to the specific area. In this case, the specific area may refer to an area in which the shooting may not be done with the default shooting condition (always ON camera). The shooting condition corresponding to the specific area may include a shooting condition allowed in a country, based on traffic laws or privacy laws that are in force in a country. For example, the shooting conditions, which are allowed within a country, may include a condition that is shot while a resolution of the camera is lower than a threshold, a condition for which a storage period of the captured image data is adjusted, a condition that is shot only at the time of a shock detection, a condition that shoots a pedestrian or a license plate of a general driving vehicle in a mosaic state in an image, a condition that the camera is off, a condition that is shot while the recording function is turned off, and the like.

In addition, when the controller 200 determines that the vehicle is positioned in the specific area, that the shooting condition of the camera 180 is the shooting condition corresponding to the specific area, and that the user input is not present, based on an input signal output from the input device 120, the controller 200 may allow the shooting condition corresponding to the specific area to be set to the camera 180. In addition, the controller 200 may allow information on the shooting condition to be output, and may control the lamp that is provided in the vehicle to be blinked, when the shooting condition that corresponds to the specific area is set to the camera 180. For example, when it is determined that the vehicle is positioned in the "A" country that is included in the specific area, the controller 200 may determine that the shooting condition of the camera 180 is the shooting condition corresponding to the specific area, and may receive the shooting condition allowed in the "A" country from the portable device or the server. When there is not the input signal output from the input device 120, the controller 200 may allow the shooting condition allowed in the "A" country to the camera 180 to be set, and may allow information of the shooting condition to be output.

Therefore, when the vehicle drives in the specific area, the controller 200 allows the shooting condition allowed in the specific area to be set to the camera 180 such that the default shooting condition set to the camera 180 can be automatically switched to the shooting condition allowed in the specific area without user's manipulation. The controller 200 may inform the user that the shooting condition is switched through the information output or the lamp blinking.

Meanwhile, when the controller 200 determines that the vehicle is positioned in the specific area, and that there is the user input, based on the input signal output from the input device 120, the controller 200 allows the shooting condition of the camera 180, which is determined based on the position of the vehicle, not to be set to the camera 180. Herein, when there is the user input while the vehicle is positioned in the specific area, the controller 200 may determine that the user has an intention not to set the shooting condition of the camera 180 determined based on the position of the vehicle in the camera 180. For example, when the controller 200 determines that the vehicle is positioned in the 'A' country included in the specific area, the controller 200 determines the shooting condition of the camera 180 as the shooting condition corresponding to the specific area, and receives the shooting condition allowed in the "A" country from the portable device or the server. In addition, when there is the input signal output from the input device 120, the controller 200 may allow the shooting condition allowed in the 'A' country not to be set to the camera 180. For example, when there is the input signal output from the input device 120, the controller 200 may allow the default shooting condition to be set to the camera 180 without allowing the shooting condition allowed in the country 'A' to be set in the camera 180.

In some forms of the present disclosure, the controller 200 may determine the shooting condition of the camera 180, based on whether or not the vehicle is positioned within a preset area that includes the shooting restriction area. When it is determined that the vehicle is positioned within the preset area including the shooting restriction area, the controller 200 may determine that the shooting condition of the camera 180 is the shooting condition corresponding to the shooting restriction area. In this description, the shooting restriction area may include civilian access control areas, around military facilities, around major communication facilities, private property areas, flagged confidential designation areas, and the like. In addition, the shooting condition corresponding to the shooting restriction area may mean the shooting condition that is allowed in the shooting restriction area. For example, the shooting conditions, which correspond to the shooting restriction area, may include a condition that is shot while a resolution of the camera is lower than a threshold, a condition for which a storage period of the captured image data is adjusted, a condition that is shot only at the time of a shock detection, a condition that shoots a pedestrian or a license plate of a general driving vehicle in a mosaic state in an image, a condition that the camera is off, a condition that is shot while the recording function is turned off, and the like.

In addition, when the controller 200 determines that the vehicle is positioned within the preset area including the shooting restriction area, that the shooting condition of the camera 180 is the shooting condition corresponding to the shooting restricted country, and that there is no user input based on the input signal output from the input device 120, the controller 200 may allow the shooting condition corresponding to the shooting restricted country to be set to the camera 180. In addition, the controller 200 may control the information of the preset shooting condition to be output and the lamp provided in the vehicle to be blinked, when the shooting condition corresponding to the shooting restricted country is set to the camera 180. For example, when the controller 200 determines that the vehicle is positioned in the preset area including the military facilities, the controller 200 determines the shooting condition of the camera 180 as the shooting condition corresponding to the shooting restricted country, and receives the shooting condition allowed in the military facilities from the portable device or the server. When there is no input signal output from the input device 120, the controller 200 may allow the shooting condition that is allowed in the military facilities to be set to the camera 180 and information of the shooting condition to be output.

Therefore, when the vehicle is positioned in the preset area that includes the shooting restriction area, the controller 200 determines the shooting condition of the camera 180 as the shooting condition corresponding to the shooting restricted country, and the controller 200 allows the shooting condition corresponding to the shooting restriction area to be set to the camera 180 such that the default shooting condition set to the camera 180 are automatically switched to the shooting condition allowed in the shooting restricted area without user's manipulation. Also, the controller 200 may inform the user that the shooting condition is switched through information output or lamp blinking.

On the other hand, when the controller 200 determines that the vehicle is positioned within the preset area that includes the shooting restriction area, that the shooting condition of the camera 180 is the shooting condition corresponding to the shooting restricted country, and that there is the user input based on the input signal output from the input device 120, the controller 200 allows the shooting condition corresponding to the shooting restricted country not to be set to the camera 180. Here, when the user input is present while the vehicle is positioned within the shooting restriction area, the controller 200 determines that the user has an intention that is not to set the shooting condition corresponding to the shooting restricted country, to the camera 180. For example, when it is determined that the vehicle is positioned in the preset area including the shooting restriction area, the controller 200 determines that the shooting condition of the camera 180 is the shooting condition corresponding to the shooting restricted country, and receives the shooting condition allowed in the shooting restriction area from the portable device or the server. When there is the input signal output from the input device 120, the controller 200 may control the shooting condition allowed in the shooting restriction area not to be set to the camera 180. For example, when there is the input signal output from the input device 120, the controller 200 may control a previous shooting condition to be set. Here, the previous shooting condition may refer to a shooting condition set to the camera 180 before the vehicle is positioned in the preset area that includes the shooting restriction area. For example, when the vehicle is positioned in the specific area before the vehicle is positioned in the preset area that includes the shooting restriction area, the controller 200 may determine the previous shooting condition as the shooting condition corresponding to the specific area. When the vehicle is not positioned in the specific area, the controller 200 may determine the previous shooting condition as the default shooting condition. The default shooting condition may mean a shooting condition (always ON camera) that is set to the camera when the vehicle is shipped.

When it is determined that the vehicle is out of the preset area including the shooting restriction area due to the moving after positioned within the preset area including the shooting restriction area, the controller 200 allows the shooting condition of the camera 180 to be set to the previous shooting condition.

In some forms of the present disclosure, when a driving route is generated according to a destination setting, the controller 200 determines whether the driving route is located in at least one of areas including the specific area and the shooting restriction area. When it is determined that the driving route is located in at least one of the specific area and the shooting restriction area, the controller 200 controls information of the shooting condition corresponding to the specific area to be output on the driving route or information of the shooting condition corresponding to the shooting restriction area to be output. Accordingly, the user may check what the shooting conditions of the camera 180 can be set in the driving route to the destination before departure.

On the other hand, when the controller 200 determines that the driving route is not located in the specific area, the controller 200 may control information of the default shooting condition to be output on the driving route. In addition, when the controller 200 determines that the driving route is not located in the area that includes the shooting restriction area, the controller 200 may control information of the shooting condition corresponding to the area in which the driving route is located, to be output. As an example, when the driving route is located in the specific area which includes the shooting restriction area, the controller 200 may determine that the shooting condition corresponding to the area in which the driving route is located is the shooting condition corresponding to the specific area. When the vehicle is not positioned in the specific area, the controller 200 may determine that the shooting condition corresponding to the area in which the driving route is located is the default shooting condition. The default shooting condition may mean the shooting condition (always ON camera) set to the camera when the vehicle is shipped.

Figure 2:
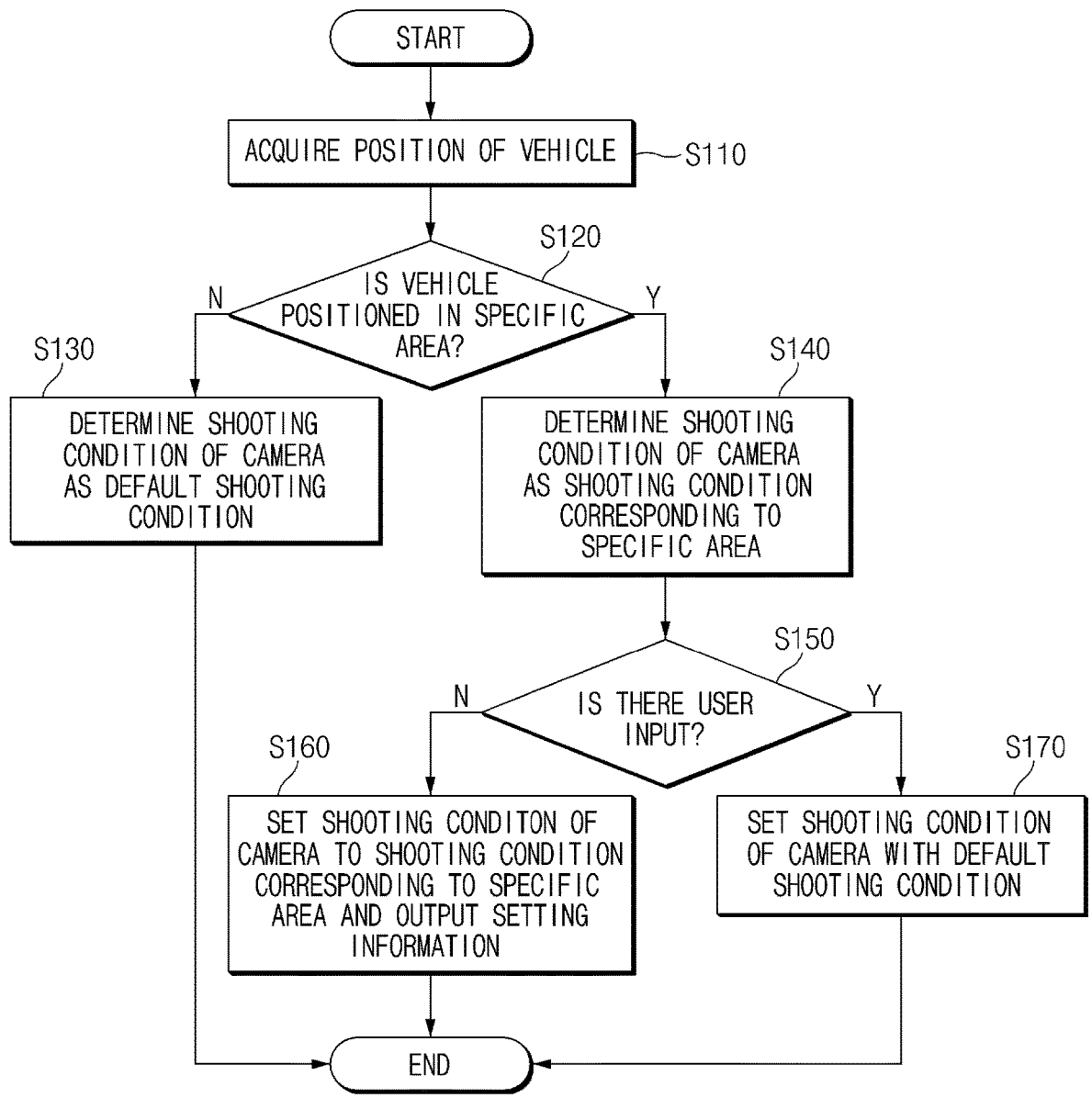
FIG. 2 is a diagram illustrating a method for recording a drive video of a vehicle in one form of the present disclosure.

FIG. 2 is a diagram illustrating a method for recording a drive video of a vehicle in some forms of the present disclosure.

As illustrated in FIG. 2, the position measuring device 150 acquires the position of the vehicle (S110). The controller 200 determines whether the vehicle is positioned in the specific area, based on the information acquired in S110 (S120).

When it is determined in S120 that the vehicle is not positioned in the specific area (N), the controller 200 determines the shooting condition of the camera 180 as the default shooting condition, and controls the determined shooting condition to be set to the camera 180 (S130). Here, the default shooting condition may mean the shooting condition (always ON camera) set to the camera when it is shipped.

Meanwhile, when it is determined in S120 that the vehicle is positioned in the specific area (Y), the controller 200 may determine that the shooting condition of the camera 180 is the shooting condition corresponding to the specific area (S140). In S140, the shooting condition corresponding to the specific area may include the shooting condition allowed in a country, based on traffic laws or privacy laws that are in force in the country. For example, the shooting conditions allowed within the country may include a condition that is shot while a resolution of the camera is lower than a threshold, a condition for which a storage period of the captured image data is adjusted, a condition that is shot only at the time of a shock detection, a condition that shoots a pedestrian or a license plate of a general driving vehicle in a mosaic state in an image, a condition that the camera is off, a condition that is shot while the recording function is turned off, and the like.

The controller 200 determines whether there is the user input, based on the input signal output from the input device 120 (S150). When the controller 200 determines that there is no user input in S150 (N), the controller 200 allows the shooting condition corresponding to the specific area to be set to the camera 180 and allows information of the shooting condition of the camera 180 to be output (S160). In S160, the controller 200 may control the lamp provided in the vehicle to be blinked.

Meanwhile, in S150, when the controller 200 determines that there is the user input based on the input signal output from the input device 120 (Y), the controller 200 allows the shooting condition corresponding to the specific area not to be set to the camera 180 (S170). In S170, the controller 200 may allow the shooting condition corresponding to the specific area not to be set to the camera 180, and allow the default shooting condition to be set as the shooting condition of the camera 180.

Figure 3:
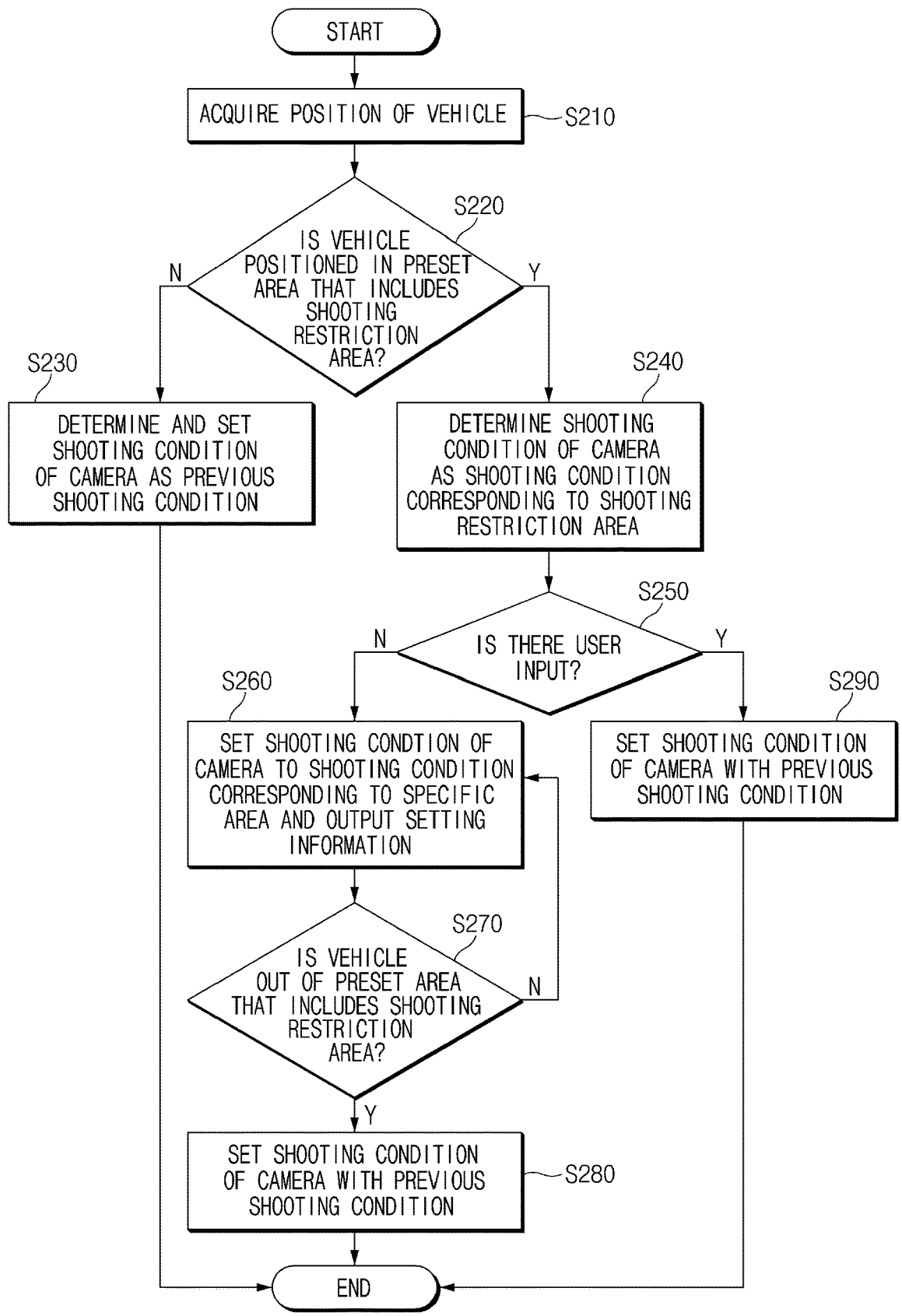
FIG. 3 is a diagram illustrating a method for recording a drive video of a vehicle in one form of the present disclosure.

FIG. 3 is a diagram illustrating a method for recording a drive video of a vehicle in some forms of the present disclosure.

As illustrated in FIG. 3, the position measuring device 150 acquires the position of the vehicle (S210). The controller 200 determines whether the vehicle is positioned within the preset area that includes the shooting restriction area, based on the information acquired in S210 (S220).

In S220, when the controller 200 determines that the vehicle is not positioned within the preset area that includes the shooting restriction area (N), the controller 200 determines that the shooting condition is the previous shooting condition, and allows the previous shooting condition to be set to the camera 180 (S230). In S230, the previous shooting condition may refer to the shooting condition set to the camera 180 before the vehicle is positioned in the preset area that includes the shooting restriction area. For example, when the vehicle is positioned in the specific area before the vehicle is positioned in the preset area that includes the shooting restriction area, the controller 200 may determine that the previous shooting condition is the shooting condition corresponding to the specific area. When the vehicle is not positioned in the specific area, the controller 200 may determine that the previous shooting condition is the default shooting condition. The default shooting condition may mean the shooting condition (always ON camera) set to the camera when the vehicle is shipped.

Meanwhile, in S220, when the controller 200 determines that the vehicle is positioned in the shooting restriction area (Y), the controller 200 may determine that the shooting condition of the camera 180 is the shooting condition corresponding to the shooting restriction area (S240). In S240, the shooting condition corresponding to the specific area may include the shooting condition allowed in a country, based on traffic laws or privacy laws that are enforced in the country. For example, the shooting conditions allowed in the country may include a condition that is shot while a resolution of the camera is lower than a threshold, a condition for which a storage period of the captured image data is adjusted, a condition that is shot only at the time of a shock detection, a condition that shoots a pedestrian or a license plate of a general driving vehicle in a mosaic state in an image, a condition that the camera is off, a condition that is shot while the recording function is turned off, and the like.

The controller 200 determines whether there is the user input, based on the input signal output from the input device 120 (S250). In S250, when the controller 200 determines that there is no user input (N), the controller 200 allows the shooting condition corresponding to the shooting restriction area to be set to the camera 180 and allows information of the shooting condition of the camera 180 to be output (S260). In S260, the controller 200 may control the lamp provided in the vehicle to be blinked.

The controller 200 may determine whether the vehicle moves out of the preset area that includes the shooting restriction area, based on the information acquired from the position measuring device 150 (S270). In S270, when the controller 200 determines that the vehicle moves out of the preset area that includes the shooting restriction area (Y), the controller 200 allows the shooting condition of the camera 180 to be set as the previous shooting condition (S280). In S270, when the controller 200 determines that the vehicle does not leave the preset area that includes the shooting restriction area (Y), the controller 200 performs S260.

Meanwhile, in S250, when the controller 200 determines (Y) that there is the user input, based on the input signal output from the input device 120, the controller 200 allows the shooting condition corresponding to the shooting restriction area not to be set to the camera 180 (S290). In S290, the controller 200 may allow the shooting condition corresponding to the shooting restriction area not to be set to the camera 180, and may allow the shooting condition of the camera 180 to be set as the previous shooting condition.

Figure 4:
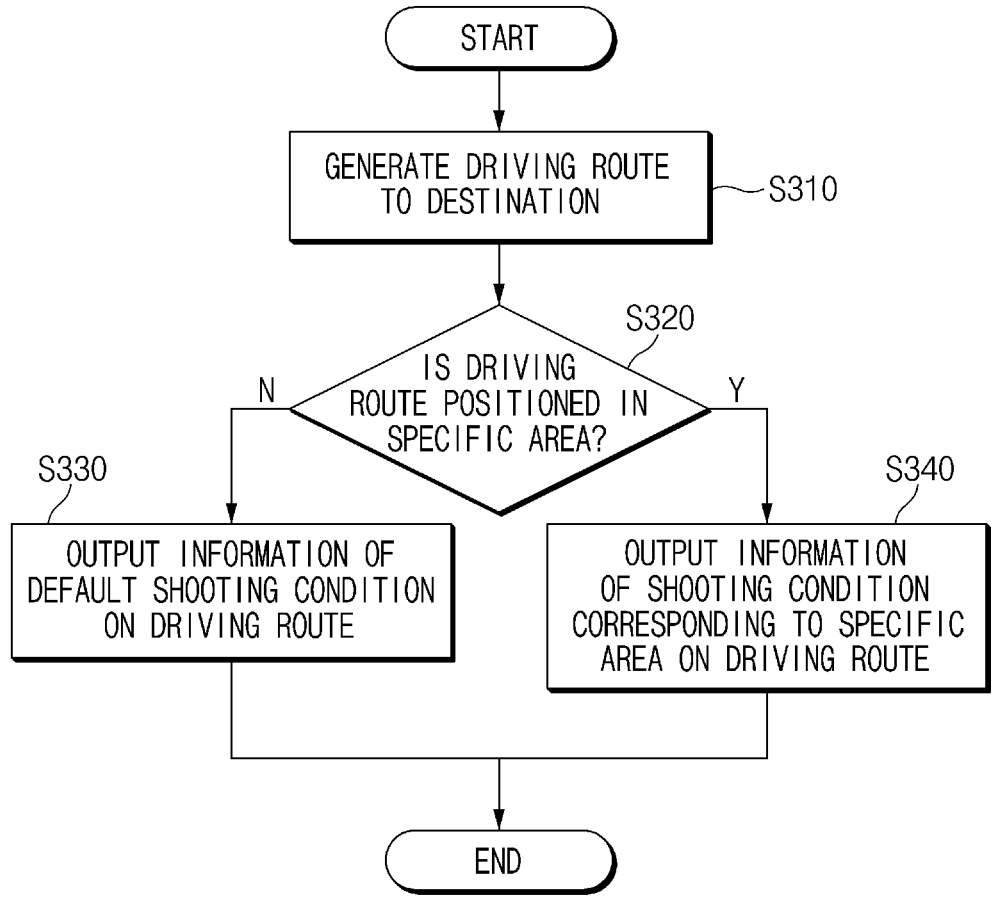
FIG. 4 is a diagram illustrating a method for recording a drive video of a vehicle in one form of the present disclosure.

FIG. 4 is a diagram illustrating a method for recording a drive video of a vehicle in some forms of the present disclosure.

As illustrated in FIG. 4, the navigation 160 generates a driving route to a destination (S310). The controller 200 determines whether the driving route to the destination is located in the specific area (S320). In S320, when the controller 200 determines that the driving route is not located (N) in the specific area, the controller 200 allows information of the default shooting condition to be output on the driving route (S330). Meanwhile, in S320, when the controller 200 determines that the driving route is located (Y) in the specific area, the controller 200 allows information of the shooting condition corresponding to the specific area to be output on the driving route.

Figure 5:
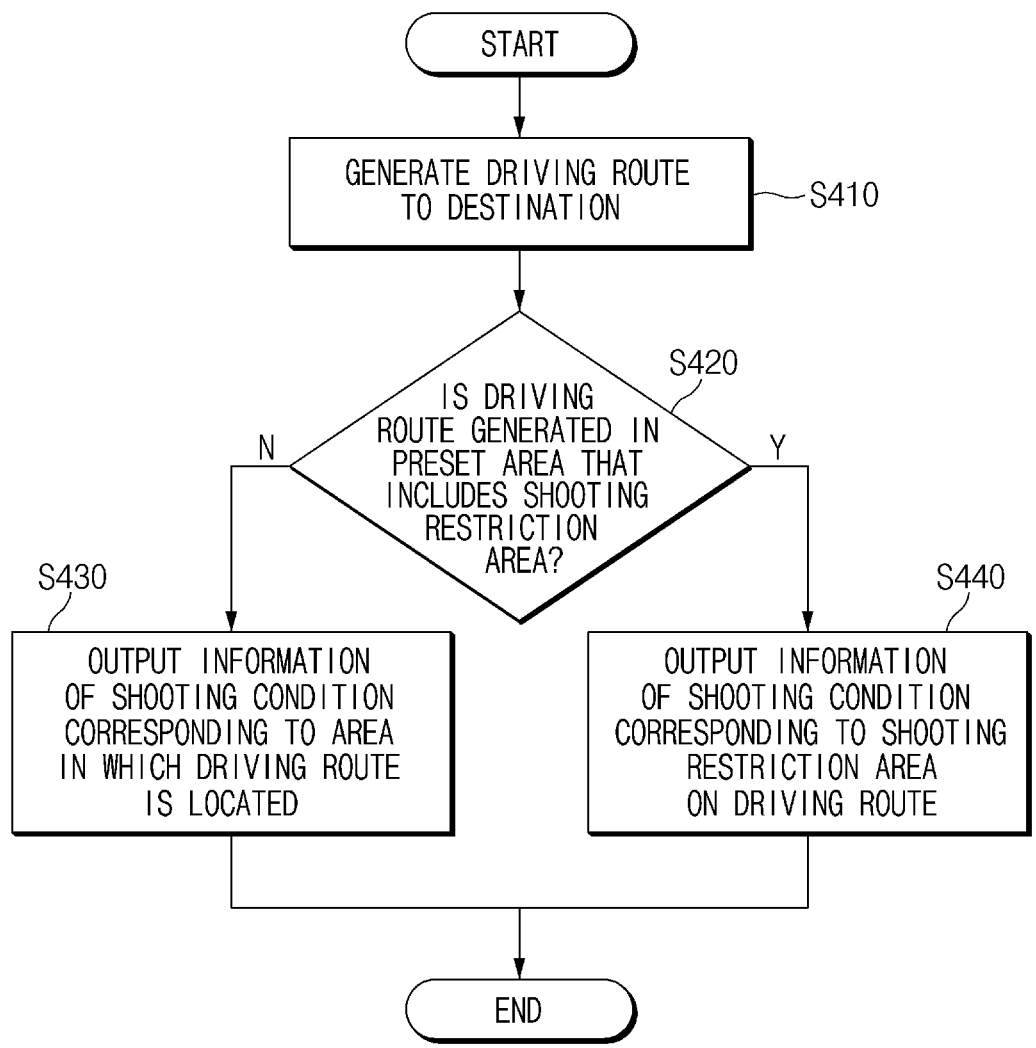
FIG. 5 is a diagram illustrating a method for recording a drive video of a vehicle in one form of the present disclosure.

FIG. 5 is a diagram illustrating a method for recording a drive video of a vehicle in some forms of the present disclosure.

As illustrated in FIG. 5, the navigation 160 generates a driving route to a destination (S410). The controller 200 determines whether the driving route to the destination is located within a preset area that includes the shooting restriction area (S420). When the controller 200 determines that the driving route is not located within the preset area including the shooting restricting area (N) in S420, the controller 200 allows information of the shooting condition corresponding to the area in which the driving route is located, to be output (S430). In S430, when the controller 200 determines that the driving route is located in the specific area, the controller 200 may determine that the shooting condition corresponding to the area in which the driving route is located, is the shooting condition corresponding to the specific area. When the driving route is not located in the specific area, the controller 200 may determine that the shooting condition corresponding to the area in which the driving route is located, is the default shooting condition. The default shooting condition may mean the shooting condition (always ON camera) set to the camera when the vehicle is shipped. On the other hand, when the controller 200 determines that the driving route is located within the preset area that includes the shooting restriction area (Y) in S420, the controller 200 allows information of the shooting condition corresponding to the shooting restriction area to be output on the driving route (S440).

Figure 6:
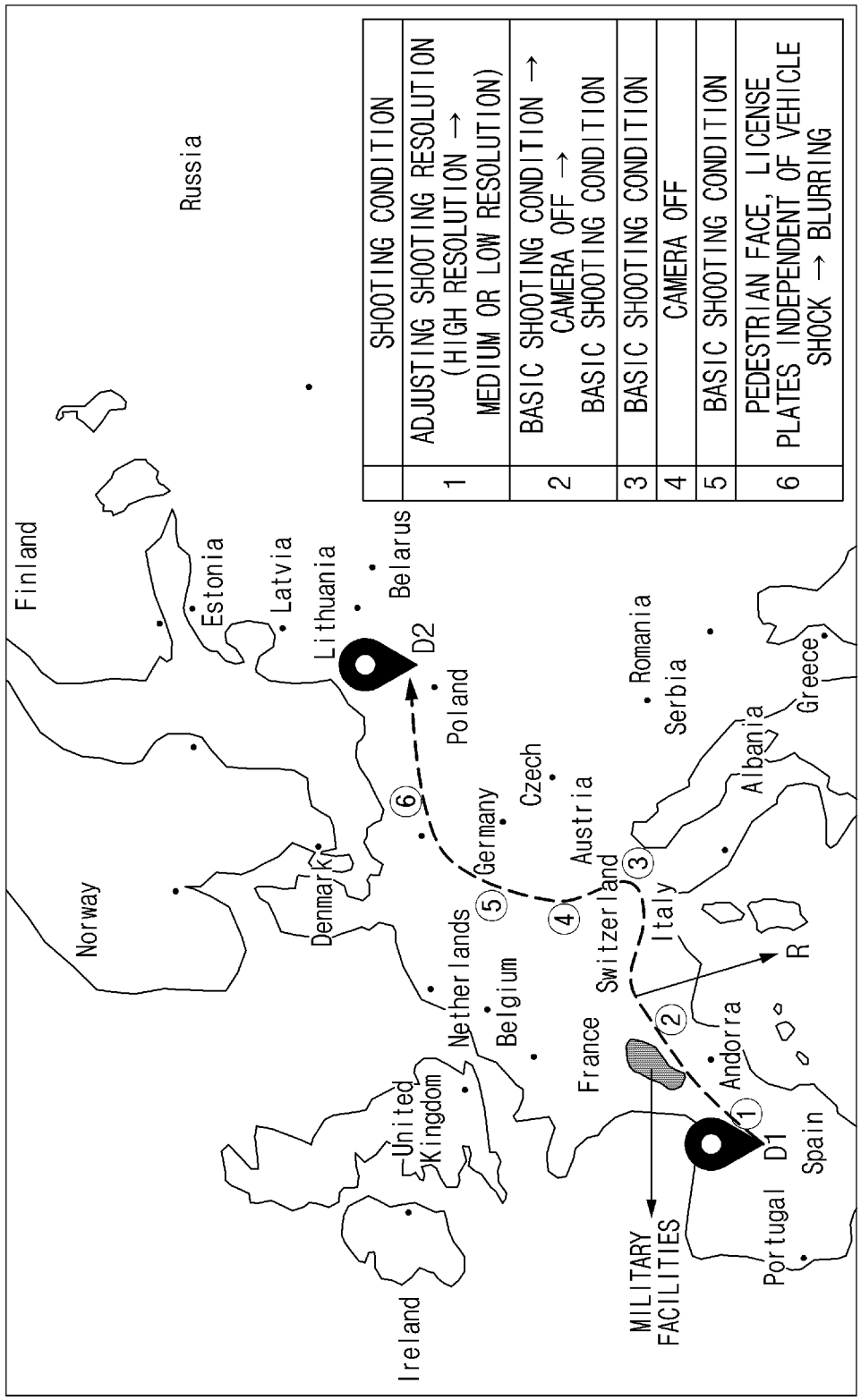
FIG. 6 is a diagram illustrating shooting conditions of a camera according to a driving route.

FIG. 6 is a diagram illustrating shooting conditions of a camera according to a driving route.

As illustrated in FIG. 6, when a driving route R from a departure D1 to a destination D2 is generated, the controller 200 may determine shooting condition (① to ⑥) of the camera 180 and may allow the determined shooting condition to be output on the driving route R, based on whether the driving route R is generated within the specific area and is generated within the shooting restriction area. For example, the controller 200 may allow the shooting condition (① to ⑥) of the camera 180, which is determined based on the position of the driving route R, to be displayed on the driving route R that is divided into a plurality of sections. Also, the controller 200 may control contents of the shooting condition of the camera 180 to be output together. Accordingly, the user may check which areas in the driving route to the destination are shot under which shooting conditions by the camera 180, before departure.

Figure 7:
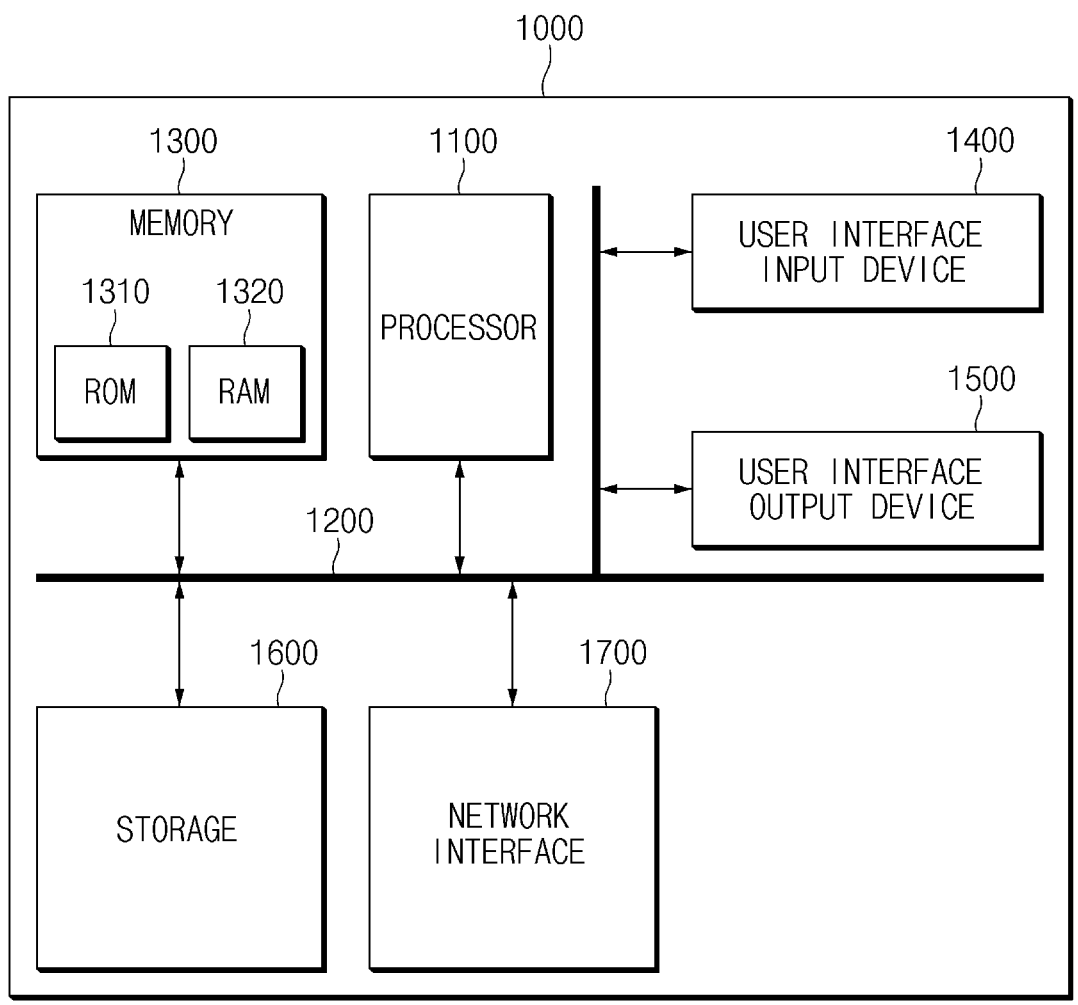
FIG. 7 is a diagram illustrating a configuration of a computing system for executing a method in one form of the present disclosure.

FIG. 7 is a diagram illustrating a configuration of a computing system for executing a method in some forms of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

As set forth above, the apparatus for recording a drive video of a vehicle and a method thereof, in some forms of the present disclosure, may increase user conveniences and provide shooting conditions suitable for area characteristics, by setting a shooting condition corresponding to an area in which the vehicle is positioned to the camera, based on the position of the vehicle, and by shooting an area around the vehicle in the shooting condition corresponding to the area in which the vehicle is positioned.

The above description is merely illustrative of the spirit of the present disclosure, and those skilled in the art to which the present disclosure pertains may make various modifications and variations without departing from the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for recording a drive video of a vehicle, the apparatus comprising:
   a position measuring device configured to acquire a position of the vehicle;
   a camera configured to acquire an image of an area around the vehicle; and
   a controller configured to:
      determine a shooting condition of the camera based on the position of the vehicle; and
      determine whether to apply the shooting condition to the camera, wherein the shooting condition includes a shooting condition that is allowed based on regulation enacted in an area where the vehicle is positioned.

2. The apparatus of claim 1, wherein the controller is configured to determine the shooting condition based on the position of the vehicle in a specific area.

3. The apparatus of claim 2, wherein the controller is configured to ensure that the shooting condition complies with a shooting condition corresponding to the specific area when the vehicle is positioned in the specific area.

4. The apparatus of claim 3, wherein the shooting condition corresponding to the specific area comprises a shooting condition of a country.

5. The apparatus of claim 1, wherein the controller is configured to:
determine whether to apply the shooting condition to the camera based on a user input; and
apply the shooting condition to the camera when the user input is not received.

6. The apparatus of claim 5, wherein the controller is configured to output the shooting condition when the shooting condition is applied to the camera.

7. The apparatus of claim 5, wherein the controller is configured to activate a lamp provided in the vehicle when the shooting condition is applied to the camera.

8. The apparatus of claim 5, wherein the controller is configured not to apply the shooting condition to the camera when the user input is received.

9. The apparatus of claim 1, wherein the controller is configured to ensure that the shooting condition complies with a shooting condition corresponding to a shooting restriction area when the vehicle is positioned in a preset area including the shooting restriction area.

10. The apparatus of claim 9, wherein the controller is configured to apply a previous shooting condition to the shooting condition when the vehicle is not positioned in the preset area including the shooting restriction area.

11. A method for recording a drive video of a vehicle, the method comprising:
acquiring, by a position measuring device, a position of the vehicle;
determining, by a controller, a shooting condition of a camera based on the position of the vehicle; and
determining, by the controller, whether to apply the shooting condition to the camera, wherein the shooting condition includes a shooting condition that is allowed based on regulation enacted in an area where the vehicle is positioned.

12. The method of claim 11, wherein the method comprises:
determining, by the controller, the shooting condition based on the position of the vehicle in a specific area.

13. The method of claim 12, wherein the method comprises:
ensuring, by the controller, that the shooting condition complies with a shooting condition corresponding to the specific area when the vehicle is positioned in the specific area.

14. The method of claim 13, wherein the shooting condition corresponding to the specific area comprises a shooting condition of a country.

15. The method of claim 11, wherein the method comprises:
determining, by the controller, whether to apply the shooting condition to the camera based on a user input; and
applying, by the controller, the shooting condition to the camera when the user input is not received.

16. The method of claim 15, wherein the method further comprises:
outputting, by the controller, the shooting condition when the shooting condition is applied to the camera.

17. The method of claim 15, wherein the method further comprises:
activating, by the controller, a lamp provided in the vehicle when the shooting condition is applied to the camera.

18. The method of claim 15, wherein the method comprises:
when the user input is received, not applying, by the controller, the shooting condition to the camera.

19. The method of claim 11, wherein the method comprises:
ensuring, by the controller, that the shooting condition complies with a shooting condition corresponding to a shooting restriction area when the vehicle is positioned in a preset area including the shooting restriction area.

20. The method of claim 19, wherein the method comprises:
applying, by the controller, a previous shooting condition to the shooting condition when the vehicle is not positioned in the preset area including the shooting restriction area.

* * * * *